United States Patent [19]

Siegel et al.

[11] Patent Number: 4,953,188

[45] Date of Patent: Aug. 28, 1990

[54] METHOD AND DEVICE FOR PRODUCING PHASE-CONTRAST IMAGES

[75] Inventors: Augustin Siegel, Oberkochen; Gunter Schmahl, Gottingen; Dietbert Rudolph, Nordheim, all of Fed. Rep. of Germany

[73] Assignee: Carl-Zeiss-Stiftung, Heidenheim/Brenz, Fed. Rep. of Germany

[21] Appl. No.: 361,558

[22] Filed: Jun. 5, 1989

[30] Foreign Application Priority Data

Jun. 9, 1988 [DE] Fed. Rep. of Germany ....... 3819603
Jun. 9, 1988 [DE] Fed. Rep. of Germany ....... 3819604

[51] Int. Cl.$^5$ .............................................. G21K 7/00
[52] U.S. Cl. ...................................... 378/43; 350/509; 350/510
[58] Field of Search .................. 378/43; 350/509, 510, 350/525

[56] References Cited

U.S. PATENT DOCUMENTS 3,628,848 12/1971 Nomarsle ........................... 350/510

FOREIGN PATENT DOCUMENTS

| 0814796 | 9/1957 | Fed. Rep. of Germany ...... 350/509 |
| 3642457 | 6/1988 | Fed. Rep. of Germany . |
| 60-49300 | 3/1985 | Japan ..................................... 378/43 |
| 61-88200 | 5/1986 | Japan ..................................... 378/43 |
| 63-192000 | 8/1988 | Japan ..................................... 378/43 |

OTHER PUBLICATIONS

"X-Ray Scanning Pinhole Microscope", M. Luukkala, *Electronics Letters*, Nov. 14, 1974, vol. 10, p. 481.
"Optical fluorescence microscopy in three dimensions: microtomoscopy", "Journal of Microscopy", vol. 138, Pt. 1, Apr. 1985, pp. 29–34, by R. W. Wijnaendts van Resandt et al.
"Laser Scan Microscope", Carl Zeiss publication W41-910e, West Germany (Oberkochen).
*ABC der Optik*, editor Karl Mutze, Verlag Werner Dausien, Hanaul Main, 1961, pp. 634–638, West Germany.
*Theory and Practice of Scanning Optical Microscopy*, Academic Press, 1984, pp. 79–93, 100–110, by T. Wilson and C. Sheppard.
"Circular Array", EG&G Reticon, RO0720B, Aug. 1987.
"Self-Scanned Circular Photodiode Array", EG&G Reticon, RO0064N, May 1986.
"Soft X-Ray Optics and Technology", "Proceedings of SPIE-The International Society for Optical Engineering", vol. 733, 1986, pp. 496–503, (Peter Guttmann) Berlin, W. Germany.

*Primary Examiner*—Carolyn E. Fields
*Assistant Examiner*—David P. Porta
*Attorney, Agent, or Firm*—Stonebraker, Shepard & Stephens

[57] ABSTRACT

For producing phase-contrast images with a microscope which scans the object point-by-point with a beam of illuminating radiation, the illuminating radiation is focused by an objective (31, 32) including a phase-shifting element (33) of preselective geometry. A radiation-sensitive detector (36) is positioned directly behind the object plane (34), seen in the direction of the light; and the shape of the radiation-sensitive area of the detector is adapted to encompass the path of the radiation passing through the geometry of the phase-shifting element (33) of the objective (31, 32), e.g., where the phase-shifting elements (33) comprise an annular aperture, an appropriately conforming annular diaphragm (35) is arranged in front of the detector (36). The advantage of this arrangement is that it does not use any radiation-collecting lens system between the object plane (34) and the detector (36).

10 Claims, 5 Drawing Sheets

METHOD AND DEVICE FOR PRODUCING PHASE-CONTRAST IMAGES

The present invention relates to a method and device for producing phase-contrast images with a microscope which scans the object point-by-point.

BACKGROUND

Optical scanning microscopes, frequently also referred to as "laser scan microscopes", have been known for a long time. For example, the "Journal of Microscopy", Vol. 138, Pt 1, (Apr. 1985on pages 29–34, describes an optical scanning microscope of confocal construction which effects the scanning of the object by means of a moving table. The optical system of this microscope is stationary and is designed to focus the smallest possible light spot which can be produced with limited diffraction in the object plane. A condenser, in the form of a second objective, serves to collect the light which passes through the object. A photomultiplier is positioned behind said objective (after corresponding deflection of the beam), and the signals of the photomultiplier are used to create the object image on a monitor.

A scanning optical microscope of a somewhat different construction is shown in the Carl Zeiss publication W41-910e, "Laser Scan Microscope: An Optical Scanning Microscope", printing annotation IX/84. In this scanning microscope, the laser beam, which is used for the scanning, is itself moved over the stationary object. The construction of this scanning optical microscope is shown in FIG. 1 and will be described further below with reference to said figure.

In conventional microscopes, "Zernicke phase contrast" is a contrast method which has been used for a long time. The theory and practice of this method are, for example, described in great detail in the book by Dr. H. Beyer, *Theorie und Praxis des Phasenkontrastsverfahrens* [Theory and Practice of the Phase Contrast Method], published by Akademische Verlagsgesellschaft of Frankfurt/Main in 1965. Briefly stated, the method consists in imaging a diaphragm aperture, of annular or other preselected geometric shape in the rear focal plane of the condenser of a transmitted-light microscope, on a corresponding annular phase plate in the pupil of the objective employed. The phase-contrast image is produced by interference of the light which passes directly through the object and the phase plate with the light which is diffracted on the object and passes through the objective alongside the phase annulus. A condensed description of this effect can also be found in *ABC der Optik*, editor Karl Mutze, published by Verlag Werner Dausien of Hanau/Main in 1961, on pages 634 to 638.

In their book *Theory and Practice of Scanning Optical Microscopy*, Academic Press 1984, T. Wilson and C. Sheppard describe how the Zernicke phase contrast method can also be applied to optical scanning microscopes. This reference utilizes a microscope design which is well-known in conventional microscopy, namely, the design uses a condenser and an annular diaphragm aperture in its rear focal plane. The above-described prior art optical scanning microscope for producing phase-contrast images, shown in the Carl Zeiss publication W41-910d, also uses this same conventional construction.

Copending U.S. patent application Ser. No. 30755 discloses an X-ray microscope which is suitable for producing phase-contrast images. This X-ray microscope has a condenser in the form of a first, so-called zone plate for the irradiating of the object and an objective in the form of a further zone plate with which the object is imaged. A phase-shifting element, which effects the phase contrast in a manner similar to that used in conventional optical microscopy, is arranged on the Fourier plane of the second zone plate.

Scanning microscopes for radiography are also known. In these apparatus, the object is moved in the form of a raster under an X-ray beam which is focused in the form of a spot, and the X-radiation transmitted through the object is directly detected by a detector. As a rule, no condenser is included in X-ray scanning microscopes because the zone plates which would be used as condensers have only very slight diffraction efficiency. Due to the elimination of the condenser, such microscopes can therefore operate with a lower X-ray dosage, i.e., radiation which is gentler on the object.

However, no device for producing phase-contrast images is yet known for scanning X-ray microscopes, since heretofore it has been assumed that a condenser is required for such a method and, accordingly, that it would be necessary to use a higher and undesirably damaging X-ray dose.

It is the object of this invention to create a phase-contrasting method and apparatus which can be used with scanning microscopes to produce comparable phase-contrast images at less expense and with lower radiation intensities.

SUMMARY OF THE INVENTION

The invention makes use of the surprising discovery that phase-contrast images can be produced in scanning microscopes without requiring the use of a condenser or any other radiation-collecting systems intervening between the object plane and the radiation-sensitive detector. The detector can be appropriately positioned directly below the object plane, and its radiation-sensitive area is adapted to encompass the radiation passing through the phase-shifting regions in the microscope's objective which directs the illuminating radiation onto the object. This adaptation is accomplished either by placing an apertured diaphragm in front of the detector or by designing the detector so that its photosensitive area matches the shape of the phase-shifting regions.

It has been found that this novel design, without any condenser between the object and the detector, is suitable for apparatus which operate with beam scanning, i.e., which guide the illuminating radiation over the object to be imaged, and is similarly suitable for apparatus with which the scanning movement is achieved by means which carry the object stage in raster-like movement. The precise position of the apertured diaphragm and the detector relative to the object plane is not critical as long as the radii of the diaphragm apertures are adapted to encompass the cone of radiation which is defined by the phase plate and the objective. This adaptation can be calculated or established experimentally.

The geometric relationships are, to be sure, dependent on the aperture and the linear magnification of the objective used; but solutions can always be found for different objectives, either by placing the diaphragm or annular detector surfaces at different distances from the object or by placing several diaphragms of different annular diameter and different annular width, for example, on a turret.

The invention thus makes it possible to dispense entirely with a condenser for producing phase contrast in scanning microscopes, without any loss in the quality of the image.

Since the radiation to be detected is not attenuated by absorption in a condenser or other radiation-collecting systems, one can operate with lower radiation intensity.

The method is therefore not only suitable for optical microscopes which operate in the visible spectrum but, also, is particularly suitable for X-ray microscopy since, as indicated above, it is very difficult to produce condensers having sufficiently high X-ray transmission characteristics.

Further advantages of the invention can be noted from the following detailed description in which reference is made to the accompanying drawings.

DRAWINGS

DETAILED DESCRIPTION

Figure 1:
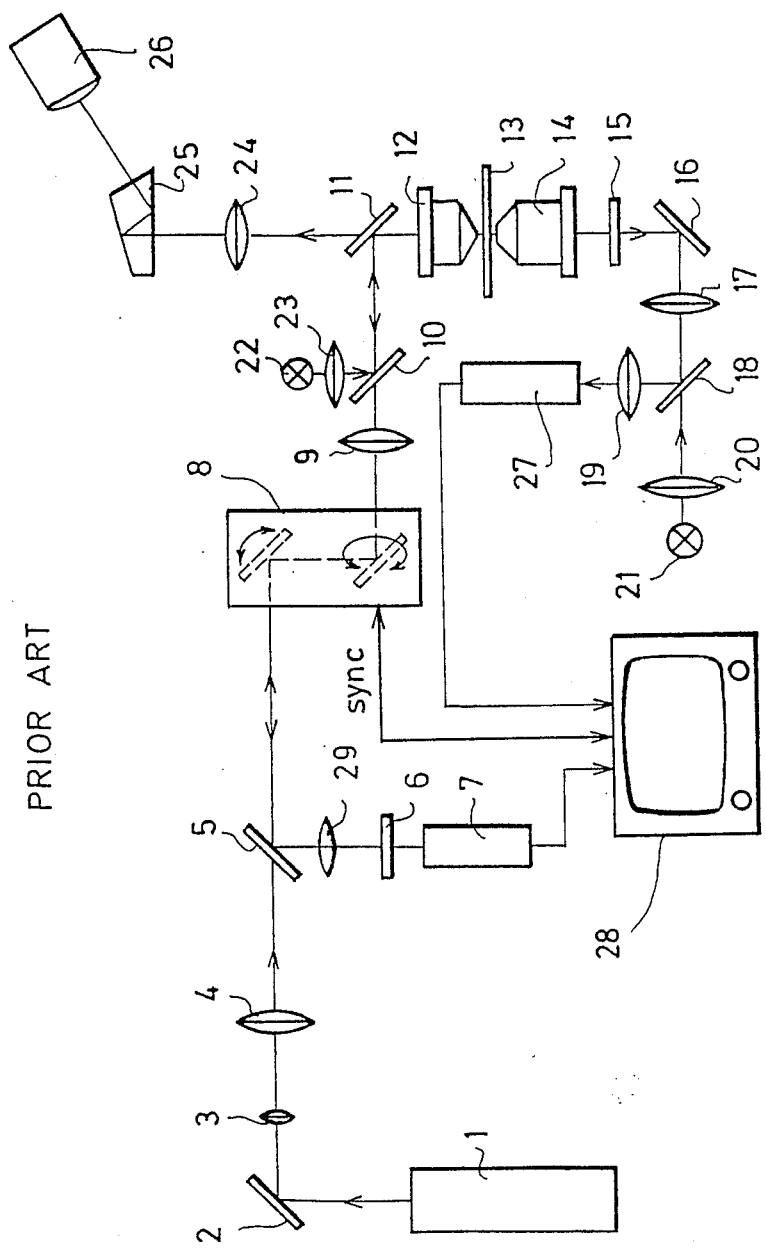
FIG. 1 is a basic diagram of an optical scanning microscope which is known per se and operates with beam scanning.

FIG. 1 shows the optical scanning microscope known from the aforementioned Carl Zeiss publication W41-910e. This prior art apparatus is constructed as follows:

The beam of illuminating radiation, for example, from an argon laser (1) is widened by a telescope lens system (3, 4) after deflection on a mirror (2) and fed to a scanning system (8) consisting of two mirrors which can be swung perpendicular to each other. The beam of light cyclically deflected by said mirrors is then reflected into the observation ray path of a microscope by a beam splitter (11) and focused on the specimen (13) by an objective (12). A lens (9) serves to image the scanning system (8) in the objective (12). A lamp (22) and a collector (23) comprise an auxiliary illuminating system which, by means of another beam splitter (10), is coaxially superimposed on the beam of the laser (1). This makes conventional microscopic observation of the object (13) possible via the observation ray path, which is shown schematically as a tube lens (24), a reflecting prism (25), and an eyepiece (26).

For the display of the object (13) by a scanning microscope, a first detector (7) is provided in the incident light ray path, the detector being arranged behind a lens (29) and a filter (6), to monitor the radiation emitted by the specimen and collected by the objective (12) after its return via the deflection unit (8). The detector (7) is located in a partial-ray path which is divided out by the beam splitter (5) between the enlargement lens system (3, 4) and the scanning device (8).

A second detector (27) is provided in order to detect, in transmitted light, the light scattered forward in the direction of the beam by the specimen (13). The second detector (27) is also arranged in a partial-ray path behind a lens (19), the partial-ray path being divided out by a beam splitter (18) from the transmitted light auxiliary illuminating ray path of the microscope. The ray path of the transmitted light auxiliary illumination consists of a lamp (21), a collector (20) of a lens (17), a reflecting mirror (16), and a condenser (14) below the specimen (13).

The signals of the two detectors (7) and (27) are fed to a monitor (28) with attached image storage. The monitor is synchronized with the tilt mirrors of the scanning device (8) and can also selectively display either an incident-light or a transmitted-light image.

For the displaying of phase-contrast images in transmitted light, the objective (12) includes a phase-shifting element of preselected geometry, e.g., annular, and the condenser (14) of this known optical scanning microscope, similar to the condenser in a conventional microscope, has corresponding annular diaphragm apertures in its rear focal plane.

Figure 2:
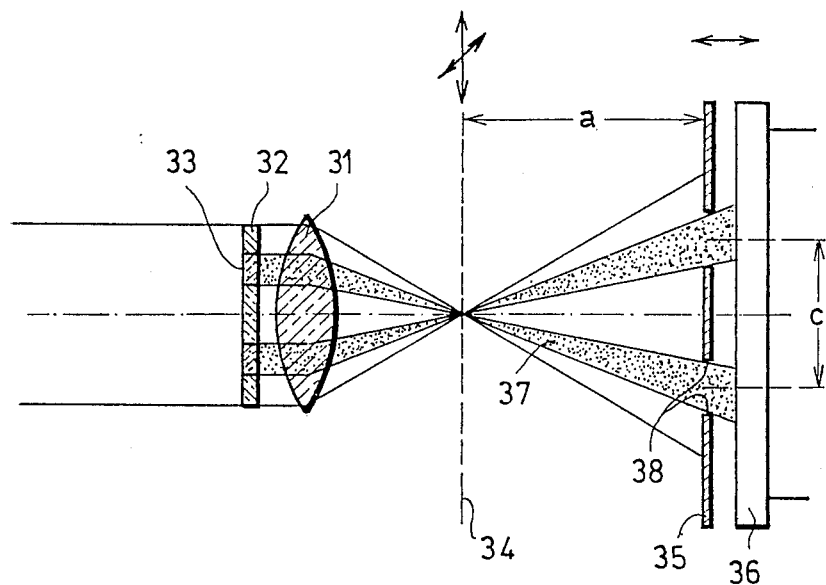
FIG. 2 is a schematic representation showing the essential optical components for producing a phase-contrast image in an optical scanning microscope with stage-scanning.

In accordance with the invention disclosed herein, it has been found that it is possible to dispense with condenser (14) and the lens system (15-19) arranged behind it. To explain this more fully, reference is now made to FIGS. 2 and 3. FIG. 2 shows the phase-contrast objective of an optical scanning microscope, depicting it schematically as lens (31) and phase plate (32), with the phase-shifting elements of this phase-contrast objective being shown as phase annulus (33). It will be appreciated that the phase annulus (33) is normally vapor-deposited directly on the lens of the objective instead of on an additional glass plate as shown in this simplified schematic.

An annular diaphragm (35) is arranged at a distance (a) behind the object plane (34) in which the objective (31) focuses the scanning light beam with limited diffraction, and directly behind said annular diaphragm there is arranged a photoelectric detector (36) having a relatively large photosensitive area. The detector can, for instance, be a diode of the "PIN 10 D" type of the UDT Company. This detector diode has a photosensitive area of a diameter of 11.3 mm.

The cone of rays (37) passing through the phase annulus (33) is shown shaded. The distance (a), between the diaphragm (35) and the object plane (34), and the diameter (c) of the annular diaphragm aperture (38) have been so selected that this cone of rays (37) passes through the diaphragm aperture (38) and strikes the photosensitive area of detector diode (36).

With this novel and simple construction, it is possible to obtain phase-contrast images by moving the object being examined in raster-like manner in the object plane (34) and utilizing the signals of the detector (36) for the imaging. The position of the annular diaphragm (35) and the detector (36) relative to the object plane is not critical as long as, when preselecting distance (a) and diameter (c), the cone of rays (37) defined by the phase plate (32) and the objective (31) passes through the diaphragm aperture (38). An interference filter may be arranged above or below the diaphragm (35) for the suppression of interfering ambient light.

Figure 3:
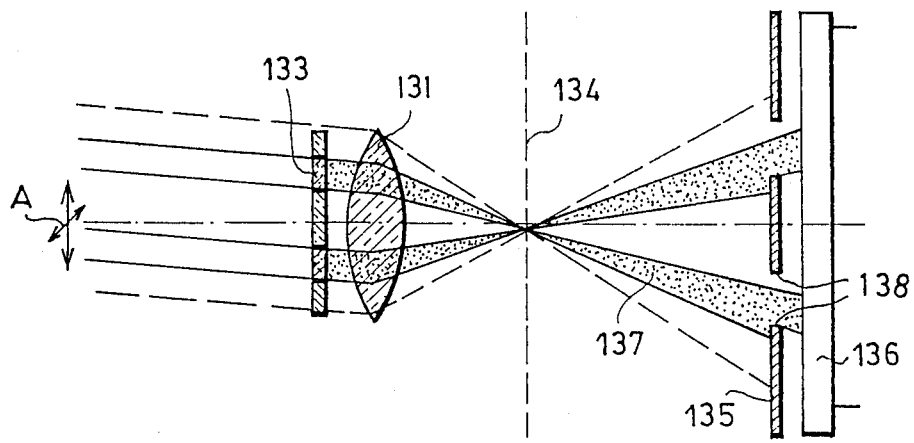
FIG. 3 is a schematic representation showing the essential optical components for producing a phase-contrast image in an optical scanning microscope with beam-scanning.

The invention disclosed herein can also be used to produce phase-contrast images when the object itself is not moved but, instead, the laser beam is scanned over the stationary object. This situation is shown in FIG. 3. The same components have been used in FIG. 3 as in the embodiment of FIG. 2. However, during the scanning of the beam, a partial trimming of the cone of rays (137) passing through the phase annulus (33) occurs due to the movement of the laser beam [indicated by the double arrow (A)]. However, in spite of this trimming, no detrimental effect can be noted on the quality of a phase-contrast image produced in this manner. This can best be explained by the following example: When using an objective like the Carl Zeiss Planapochromat 40/0.95 PH3 type, the cone of rays (137) on the detector varies by less than 0.1 mm around the central position during the scanning; and since the width of the annular diaphragm aperture (38) used in this example is two millimeters, the slight portion of trimmed light is of no consequence.

It is obvious that the diameter (c) or the distance away (a) of the diaphragm (35) must be changed when an objective with a different aperture or with different dimensions of the phase annulus is to be used. This is shown in FIG. 5. Here a detector (46) has a diaphragm (45) arranged in front of it, and the latter has a diaphragm aperture (48) of the same diameter (c) as the aperture (38) in FIG. 2. However, in this case the detector (46) and diaphragm (45) are located at a distance (b) below the object plane (44). Distance (b) must be smaller than distance (a) in FIGS. 3 and 4 in order to assure that aperture (48) encompasses the cone of rays passing through the phase annulus (43), because these rays are focused by an objective (41) of larger aperture and smaller focal length. It can be appreciated from these just described geometric considerations that it would be preferable to effect such required adaptation by appropriately altering only the diameter and width of the annular diaphragm aperture (48) while maintaining a constant distance between the diaphragm and the object plane. To accomplish this purpose, it would be possible, for example, to arrange several diaphragms of varying dimensions on a turret.

Figure 4:
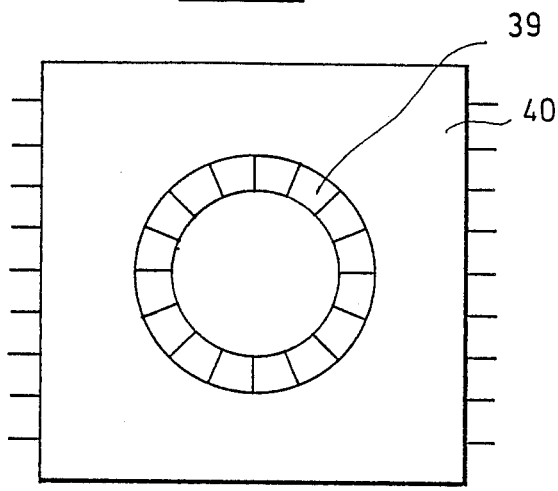
FIG. 4 shows, in an enlarged schematic top view, a detector which can be used as an alternative to the detector (36) or (136) in FIG. 2 or FIG. 3 respectively.
Figure 5:
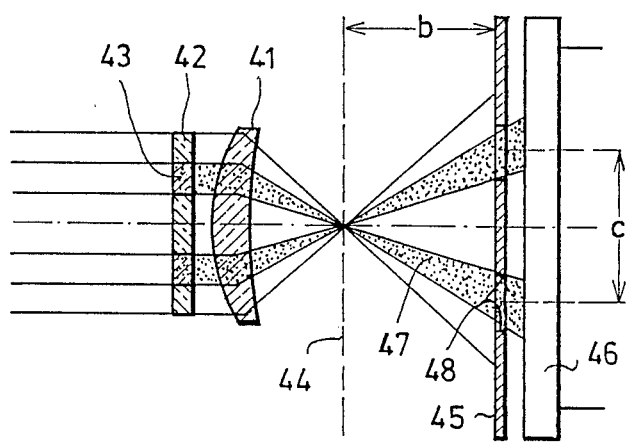
FIG. 5 is a schematic representation similar to FIG. 2 showing the optical components for producing a phase-contrast image in a scanning optical microscope similar to that shown in FIG. 2 but using an objective of shorter focal length.

It should also be noted that it is possible to dispense entirely with a diaphragm arranged in front of the photodetector by using, as shown in FIG. 4, a detector (40) having its photosensitive area (39) already shaped to encompass the phase-shifted radiation. Such detectors are, for example, available from the EG & G Reticon under the designation "Circular Array RO0720B" or "Self-Scanned Circular Photodiode Array RO0064N". Since these detectors consist of several individual diodes in annular arrangement, they can be utilized for creating phase-contrast images not only from the radiation integrally incident on the entire circular area but also from that incident only on preselectable angular areas. This makes possible additional advantageous contrasting methods similar to so-called monolateral oblique illumination, for example.

Figure 6:
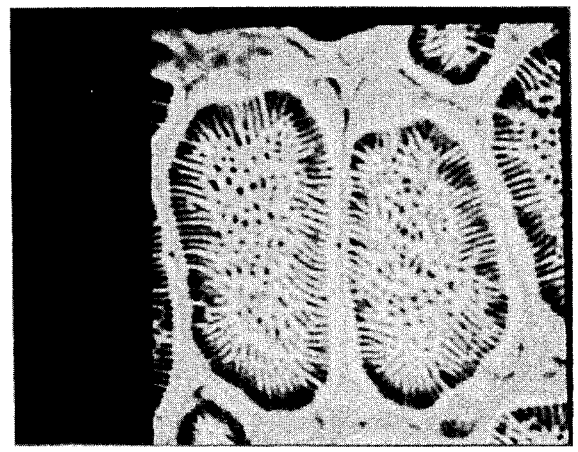
FIG. 6 shows the image of an object in phase contrast, taken by the conventional technique with a condenser.
Figure 7:
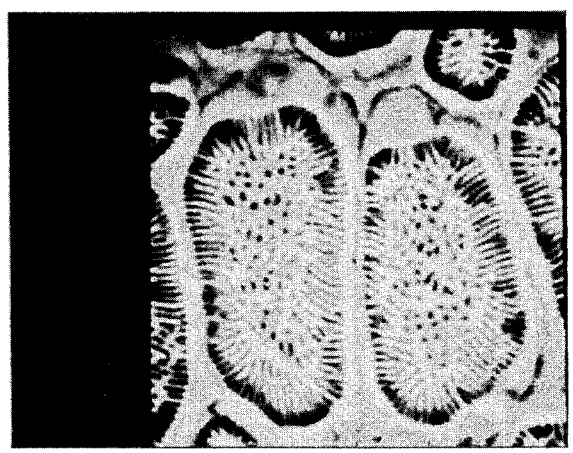
FIG. 7 shows the object of FIG. 6, taken with the construction outlined in FIG. 3.
Figure 8:
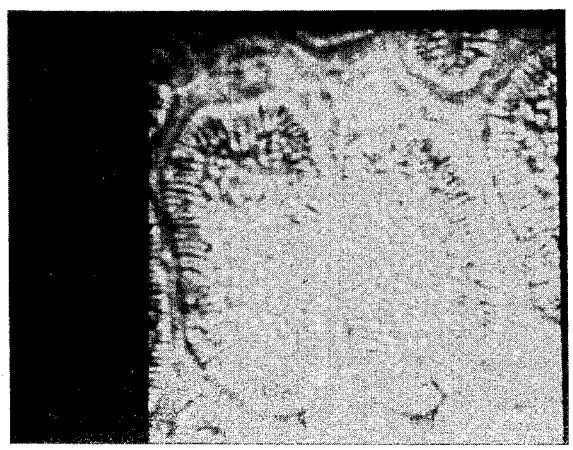
FIG. 8 shows the same object as in FIG. 7 in defocused condition.

FIGS. 6–8 permit comparison of phase-contrast images which were recorded in accordance with the state-of-the-art and those recorded in accordance with the present invention. A section through a young trout (cut crosswise) served as object. The picture of FIG. 6 was taken with a Carl Zeiss laser scan microscope of the type described with reference to FIG. 1, having a Planapochromat (40/0.95) objective and a condenser, the turret of which was set to phase annulus "No. 3". The electronic zoom of the laser scan microscope was set at a magnification factor of 45 x so that the linear magnification amounted to a total of about 1350 x.

The picture of FIG. 7 was taken on the same microscope with the same setting but with the apparatus being modified according to the invention herein, namely: (a) the condenser (14) was removed; (b) the photomultiplier (27) of FIG. 1 was disconnected; and (c) the components shown in FIG. 2 or FIG. 3 were positioned below specimen (13), with the above-mentioned diode "PIN 10 D" of the UDT Company used as the detector for photographing the phase-contrast image. As is apparent from a comparison of FIGS. 6 and 7, the invention produced a phase-contrast image of equally good quality as was produced with the more complex and more expensive prior art apparatus.

Defocusing was thereupon effected out of the object plane. The resulting picture is shown in FIG. 8. As can be noted, a contrast reversal takes place in the image, in the same manner as it does in the phase contrast of conventional microscopy.

Figure 9:
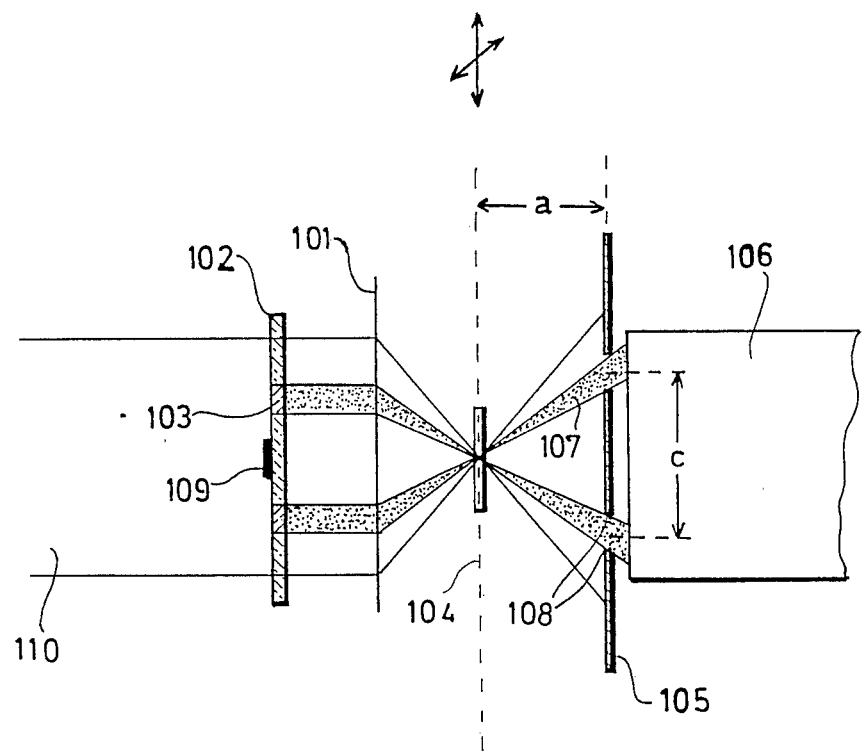
FIG. 9 shows schematically the essential optical components for producing a phase-contrast image in an X-ray scanning microscope.

In the X-ray scanning microscope shown in FIG. 9, a zone plate (101) serves for the punctiform focusing on the object (104) of radiation (110) emitted by a source of X-rays (not shown). Such a zone plate is for example described in the above-mentioned U.S. patent application Ser. No. 130775.

The object (104) is located on a mechanical stage which is moved in raster-like manner by a well-known device which is not shown.

Seen in the direction of the light, a phase plate (102) is arranged in front of the zone plate (101) in the focusing plane of the zone plate (101), i.e., in the pupil plane of the objective. This phase plate bears a phase annulus designated (103) which shifts the phase of the part of the X-radiation passing through it with respect to the part of the radiation passing outside the annulus (103). The phase shift is preferably set at 90 or at some other amount selected with a view toward the best possible image contrast.

Behind the object plane (104) in which the objective (101) focuses the scanning X-ray beam with limited diffraction, there is arranged an annular diaphragm (105) at a distance away (a) and, directly behind it, a detector (106) having a relatively large photosensitive area. The detector can, for instance, be a proportional counter such as described in "Proceedings of SPIE—The International Society for Optical Engineering", Vol. 733 (1986), under the title "Soft X-ray Optics and Technology", on pages 496–503.

The cone of rays (107) passing through the phase annulus (103) is shown shaded. The distance (a) between the diaphragm (105) and the object plane (104) and the diameter (c) of the annular diaphragm aperture (108) have been so selected that this cone of rays (107) passes through the diaphragm aperture (108) and strikes the detector (106) within the photosensitive area.

It is now possible to obtain phase-contrast images by moving the microscope object to be examined in raster-like manner in the object plane (104) and utilizing the signals of the detector (106) for the imaging. The position of the annular diaphragm (105) and the detector (106) relative to the object plane is not critical as long as distance (a) and diameter (c) are suitably selected so that the cone of rays (107) which is defined by phase plate (103) and objective (101) passes through the diaphragm aperture (108). In the manner noted above, an interference filter can be arranged above or below the diaphragm (105) in order to suppress interfering ambient light.

In addition to the phase annulus (103), the phase plate (102) also bears a central diaphragm (109). This diaphragm serves to keep that part of the X-radiation which otherwise passes unaffected through the phase plate (102) away from the object (104). This is done to protect the object (104) from unnecessary radiation. This is, due to the limited X-ray diffraction properties of the object (104), this direct radiation would not be diffracted sufficiently to pass through the diaphragm aperture (108) and so would not interfere there with the phase-shifted part of the X-radiation. Therefore, such direct radiation would not enhance the image but rather would only unnecessarily act on the object (104).

We claim:

1. A method for creating phase-contrast images with a microscope which scans the object point-by-point with a cone of illuminating radiation passed through an objective and phase-shifting elements of preselected geometry in the vicinity of its pupil plane, comprising (a) positioning a radiation detector directly behind the plane of the object so that radiation coming from the object impinges upon said detector without passing through any intervening collecting optical system, and (b) adapting the radiation-sensitive area of the detector to encompass the cone of radiation passing through the phase-shifting elements.

2. A scanning microscope having means for illuminating an object with a point-by-point scan of a cone of radiant energy which passes through an objective including a phase-shifting element of preselected geometry, said microscope also having detection means including a radiation-sensitive area for detecting radiant energy coming from the illuminated object, characterized by the fact that said radiation-sensitive area is arranged directly behind the plane of the object so that radiation coming from the object impinges upon the radiation-sensitive area without passing through any intervening radiation-collecting system, and means for adapting the shape of said radiation-sensitive area to encompass the cone of radiation passing through the phase-shifting element.

3. A microscope according to claim 2 wherein the phase-shifting element in the objective and the radiation-sensitive area of the detection means are of annular shape.

4. A microscope according to claim 2 wherein said adapting means comprises a diaphragm arranged in front of the radiation-sensitive area of the detection means to adapt it to encompass said cone of radiation.

5. A microscope according to claim 4 wherein said adapting means comprises a plurality of diaphragms positioned at different distances from said object plane.

6. A microscope according to claim 4 wherein said adapting means comprises a plurality of diaphragms, having different sizes of annular apertures arranged on a turret.

7. A microscope according to claim 2 wherein said detection means comprises a semiconductor sensor with an annular radiation-sensitive area consisting of several individual elements.

8. A microscope according to claim 2 wherein a scanning device deflects said beamed radiant energy for the point-by-point scanning of the object.

9. A microscope according to claim 2 further characterized by slide means for carrying said object in a raster-like movement to provide the point-by-point scanning of the object by said beamed radiant energy.

10. A microscope according to claim 2 further characterized by filter means arranged between the object plane and the detection means for suppression of ambient light.

* * * * *